(12) United States Patent
Zmudzinski et al.

(10) Patent No.: US 10,282,306 B2
(45) Date of Patent: *May 7, 2019

(54) SUPPORTING SECURE MEMORY INTENT

(71) Applicant: INTEL CORPORATION, Santa Clara, CA (US)

(72) Inventors: Krystof C. Zmudzinski, Forest Grove, OR (US); Siddhartha Chhabra, Hillsboro, OR (US); Uday R. Savagaonkar, Portland, OR (US); Simon P. Johnson, Beaverton, OR (US); Rebekah M. Leslie-Hurd, Portland, OR (US); Francis X. McKeen, Portland, OR (US); Gilbert Neiger, Hillsboro, OR (US); Raghunandan Makaram, Northborough, MA (US); Carlos V. Rozas, Portland, OR (US); Amy L. Santoni, Scottsdale, AZ (US); Vincent R. Scarlata, Beaverton, OR (US); Vedvyas Shanbhogue, Austin, TX (US); Ilya Alexandrovich, Haifa (IL); Ittai Anati, Haifa (IL); Wesley H. Smith, Raleigh, NC (US); Michael Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,364

(22) Filed: Jan. 3, 2018

(65) Prior Publication Data
US 2018/0239713 A1 Aug. 23, 2018

Related U.S. Application Data

(63) Continuation of application No. 14/738,037, filed on Jun. 12, 2015, now Pat. No. 9,875,189.

(51) Int. Cl.
*G06F 12/14* (2006.01)
*G06F 9/455* (2018.01)
(Continued)

(52) U.S. Cl.
CPC .......... *G06F 12/1009* (2013.01); *G06F 9/455* (2013.01); *G06F 9/45558* (2013.01);
(Continued)

(58) Field of Classification Search
CPC .......... G06F 9/455; G06F 9/50; G06F 12/023; G06F 12/0246; G06F 12/0284;
(Continued)

(56) References Cited

U.S. PATENT DOCUMENTS 4,972,338 A * 11/1990 Crawford ............ G06F 12/1027
711/164
5,265,227 A * 11/1993 Kohn ................... G06F 12/1027
711/164

(Continued)

FOREIGN PATENT DOCUMENTS

| JP | 2000276397 | 10/2000 |
|---|---|---|
| JP | 2003280989 | 10/2003 |

(Continued)

OTHER PUBLICATIONS

Hardware-Assisted Run-Time Monitoring for Secure Program Execution on Embedded Processors; Arora et al; IEEE Transactions on Very Large Scale Integration (VLSI) Systems, col. 14, iss. 12; Dec. 2006; pp. 1295-1308 (14 pages) (Year: 2006).*

(Continued)

*Primary Examiner* — Daniel C. Chappell
(74) *Attorney, Agent, or Firm* — Lowenstein Sandler LLP

(57) ABSTRACT

A processor for supporting secure memory intent is disclosed. The processor of the disclosure includes a memory execution unit to access memory and a processor core
(Continued)

coupled to the memory execution unit. The processor core is to receive a request to access a convertible page of the memory. In response to the request, the processor core to determine an intent for the convertible page in view of a page table entry (PTE) corresponding to the convertible page. The intent indicates whether the convertible page is to be accessed as at least one of a secure page or a non-secure page.

11 Claims, 12 Drawing Sheets

(51) Int. Cl.
   *G06F 12/109* (2016.01)
   *G06F 12/1009* (2016.01)
   *G06F 12/1027* (2016.01)
   *G06F 12/1036* (2016.01)
   *G06F 12/1045* (2016.01)

(52) U.S. Cl.
   CPC ........ *G06F 12/109* (2013.01); *G06F 12/1027* (2013.01); *G06F 12/1036* (2013.01); *G06F 12/1441* (2013.01); *G06F 12/1045* (2013.01); *G06F 2009/45583* (2013.01); *G06F 2212/1016* (2013.01); *G06F 2212/1052* (2013.01); *G06F 2212/151* (2013.01); *G06F 2212/657* (2013.01); *G06F 2212/684* (2013.01)

(58) Field of Classification Search
   CPC .. G06F 12/0292; G06F 12/10; G06F 12/1009; G06F 12/1027; G06F 2212/65–2212/657; G06F 2212/681–2212/68
   See application file for complete search history.

(56) References Cited

U.S. PATENT DOCUMENTS

| | | | |
|---|---|---|---|
| 5,555,395 A * | 9/1996 | Parks | G06F 12/1027 711/145 |
| 5,666,509 A * | 9/1997 | McCarthy | G06F 12/0888 711/202 |
| 5,715,420 A * | 2/1998 | Kahle | G06F 12/1027 711/206 |
| 6,233,667 B1 | 5/2001 | Shaylor et al. | |
| 6,976,175 B2 | 12/2005 | England et al. | |
| 7,124,274 B2 | 10/2006 | Watt et al. | |
| 7,146,477 B1 | 12/2006 | Strongin et al. | |
| 7,219,369 B2 | 5/2007 | Hashimoto et al. | |
| 7,412,579 B2 | 8/2008 | O'Connor et al. | |
| 7,426,644 B1 | 9/2008 | Strongin et al. | |
| 7,444,523 B2 | 10/2008 | Morais et al. | |
| 7,493,460 B2 * | 2/2009 | Zimmer | G06F 9/4403 711/166 |
| 7,886,098 B2 | 2/2011 | Kershaw et al. | |
| 8,019,964 B2 * | 9/2011 | Greiner | G06F 12/1009 711/202 |
| 8,683,115 B2 * | 3/2014 | Balasubramanian | H03K 19/0016 711/103 |
| 9,875,189 B2 * | 1/2018 | Zmudzinski | G06F 12/1009 |
| 2003/0084346 A1 | 5/2003 | Kozuch et al. | |
| 2004/0003321 A1 | 1/2004 | Glew et al. | |
| 2004/0123029 A1 | 6/2004 | Dalal et al. | |
| 2005/0132122 A1 | 6/2005 | Rozas | |
| 2005/0213768 A1 | 9/2005 | Durham et al. | |
| 2006/0087893 A1 | 4/2006 | Nishihara et al. | |
| 2006/0143411 A1 | 6/2006 | O'Connor | |
| 2007/0136577 A1 | 6/2007 | Bade et al. | |
| 2007/0156999 A1 | 7/2007 | Durham et al. | |
| 2008/0082772 A1 * | 4/2008 | Savagaonkar | G06F 12/145 711/163 |
| 2008/0235534 A1 | 9/2008 | Schunter et al. | |
| 2008/0294848 A1 | 11/2008 | Harris et al. | |
| 2009/0245521 A1 | 10/2009 | Vembu et al. | |
| 2009/0293132 A1 | 11/2009 | Henry et al. | |
| 2010/0031370 A1 | 2/2010 | Ellison et al. | |
| 2010/0125708 A1 | 5/2010 | Hall et al. | |
| 2010/0169635 A1 | 7/2010 | Chinnaswamy et al. | |
| 2010/0169968 A1 | 7/2010 | Shanbhogue et al. | |
| 2011/0161677 A1 | 6/2011 | Savagaonkar et al. | |
| 2011/0191562 A1 | 8/2011 | Chou et al. | |
| 2011/0208935 A1 * | 8/2011 | Grisenthwaite | G06F 12/1009 711/163 |
| 2011/0283071 A1 | 11/2011 | Yokoya et al. | |
| 2012/0159184 A1 | 6/2012 | Johnson et al. | |
| 2012/0163589 A1 | 6/2012 | Johnson et al. | |
| 2012/0216049 A1 | 8/2012 | Boivie et al. | |
| 2013/0160133 A1 | 6/2013 | Avgerinos et al. | |
| 2013/0232345 A1 | 9/2013 | Johnson et al. | |
| 2014/0089617 A1 | 3/2014 | Polzin et al. | |
| 2015/0089173 A1 * | 3/2015 | Chhabra | G06F 12/1408 711/163 |
| 2016/0085695 A1 | 3/2016 | Leslie-Hurd et al. | |
| 2016/0179696 A1 | 6/2016 | Zmudzinski | |
| 2016/0179702 A1 | 6/2016 | Chhabra et al. | |
| 2016/0182223 A1 | 6/2016 | Kishinevsky et al. | |
| 2016/0283411 A1 | 9/2016 | Sheller et al. | |
| 2016/0378664 A1 | 12/2016 | Leslie-Hurd et al. | |

FOREIGN PATENT DOCUMENTS

| | | |
|---|---|---|
| JP | 2005512228 | 4/2005 |
| JP | 2007129482 | 5/2007 |
| JP | 2008293494 | 12/2008 |
| WO | WO2003050688 | 6/2003 |
| WO | WO2011078855 | 6/2011 |

OTHER PUBLICATIONS

Improving Cost, Performance, and Security of Memory Encryption and Authentication; Yan et al; Proceedings of the 33rd annual international symposium on Computer Architecture; Jun. 17-21, 2006; pp. 179-190 (12 pages) (Year: 2006).*

Supplementary European Search Report dated Apr. 4, 2017, on application No. EP 14 84 9831, 7 pages.

International Search Report dated Dec. 17, 2014, on application No. PCT/US2014/055807, 3 pages.

Arora et al, "Hardware-Assisted Run-Time Monitoring for Secure Program Execution on Embedded Processors", IEEE Transaction on Very Large Scale Integration (VSLI) Systems, col. 14, iss. 12; Dec. 2006; pp. 1295-1308 (14 pages).

Yan et al., "Improving Cost, Performance, and Security of Memory Encryption and Authentication", Proceedings of the 33rd annual international symposium on Computer Architecture; Jun. 17-21, 2006; pp. 179-190 (12 pages).

* cited by examiner

SUPPORTING SECURE MEMORY INTENT

RELATED APPLICATIONS

This application is a continuation of U.S. patent application Ser. No. 14/738,037, filed Jun. 12, 2015, the entirety of which is incorporated herein by reference.

TECHNICAL FIELD

Embodiments of the disclosure relate generally to computer systems, and more specifically, but without limitation, to supporting secure memory intent.

BACKGROUND

Modern processors are designed to protect sensitive data in memory from both hardware and software attacks. Some processors provide strategies that can reserve a range of platform memory and enforce encryptions on this range of memory. The memory encryptions protect the confidentially of memory-resident data. In some situations, the memory ranges may comprise multiple sections of convertible pages that can be converted to secure pages or non-secure pages.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
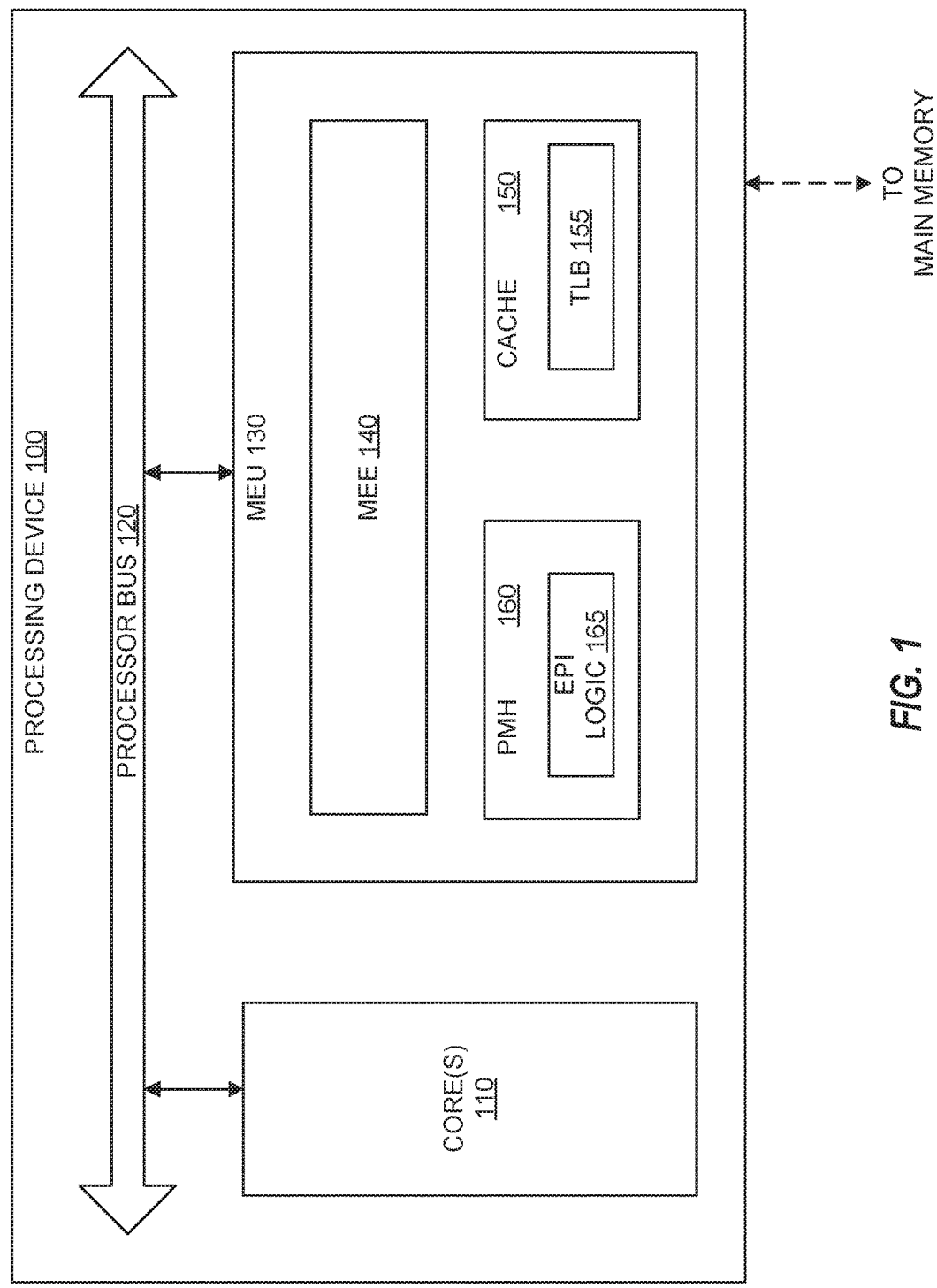
FIG. 1 illustrates a block diagram of a processing device according to one embodiment.

Techniques to support secure memory intent are described. In some embodiments, a processor is provided. The processor includes a memory execution unit to access memory and a processor core coupled to the memory execution unit. The processor core may receive a request to access a convertible page from memory. A convertible page (also referred to herein as convertible memory) may refer a section of memory including memory pages that can either be a secure page, such as an Enclave Page Cache (EPC), or a non-secure page (e.g., regular pages). In response to the request, the processor core determines an intent for the convertible page in view of an indicator in a page table entry (PTE corresponding to the convertible page). The intent indicates whether the convertible page is to be accessed as at least one of a secure page or non-secure page.

Embodiments described herein may use a flexible EPC architecture, which may define convertible memory in a range of physical memory for a computer system. This convertible memory includes a plurality of convertible pages that can include either secure or non-secure pages. A secure page may refer to a page of memory in which encryption, integrity, and replay protections are implemented to protect the pages from both hardware and software attacks. A non-secure page may refer to a page of memory in which these protections are not implemented and thus, can be accessed freely. The flexible EPC architecture allows for the dynamic re-partitioning of memory by system software to either secure or non-secure pages when the demand for secure memory is strong due to certain types of system workloads. In some embodiment, the flexible EPC architecture may track the identification and protection of the memory at page-granularity (or section-granularity). In one embodiment, a page cache map, refer to herein as Enclave Page Cache Map (EPCM), may be used to track security attributes of convertible memory. For example, the EPCM may include a secure bit that, when set for a particular EPCM entry, indicates that the corresponding convertible page is currently set to secure.

Each page in the physical memory for a computer system may be associated with a virtual address (e.g., an address in an address space made available by the system software) that may require translation to a physical address (e.g., an address associated with the memory of the processing device). In most systems, a translation lookaside buffer (TLB) may store information used to translate the virtual address to the physical address. Typically, the TLB is a cache that memory management hardware uses to improve virtual address translation speed. For example, in a virtual computer system virtual addresses may map to physical addresses in main memory of an underlying actual physical computer system. In a flexible EPC architecture, when a memory access of a convertible page results in a TLB miss, a current security state of that page may need to be looked up by accessing the secure bit information in the EPCM. Embodiments of the disclosure may use hardware internals, such as a bit in the PTE, to indicate the current security state of the page, thereby eliminating any overhead incurred to retrieve this information from the EPCM. This indication may be referred to herein as EPC page intent (EPI).

FIG. 1 is a block diagram illustrating a processing device 100, which may implement EPI according to one embodiment. Processing device 100 may be generally referred to as "processor" or "CPU". The processing device 100 may include various components. In one embodiment, processing device 100 may include one or more processors cores 110 and a memory execution unit (MEU) 130 among other components coupled to each other as shown. The processing device 100 may also include a communication component, such as processor bus 120, that may be used to communicate between various components of the processing device 100 and/or other system components outside of the processing device 100. Moreover, the processor bus 120 may be in communication to enable data routing between various components inside or outside of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system.

The processor core 110 may execute instructions of the processing device 100. The processor core 110 may be used with a computing system on a single integrated circuit (IC) chip of a computing system. One embodiment of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces, may also be used. Thus, embodiments of the disclosure are not limited to any specific combination of hardware circuitry and software.

MEU 130 may coordinate functions that enable the processor device 100 to access and communicate with main memory (not shown) that includes a volatile memory and/or a non-volatile memory. In one embodiment, the MEU 130 may include or may be coupled to a memory encryption engine (MEE) 140, for example, via a system agent (not shown). The MEE provides cryptographic mechanisms for encryption, integrity, and replay protection for secure pages in main memory. Secure pages in memory may refer to a page of memory in which encryption, integrity, and replay protections are implemented to protect the pages from both hardware and software attacks.

The main memory may be divided into regions, including one or more protected regions (also referred to herein as secure memory range or MEE region). The MEE 140 may perform encryption, decryption and authentication of data moving in and out of the protected region(s) of the main memory. Each region of memory (e.g., main memory) may have multiple sections including, but not limited to, an EPC section that is convertible to secure and non-secure pages. In one embodiment, the protected region of the EPC section may be a fixed range or multiple protected regions (MEE regions) may be a set of multiple fixed ranges. In another embodiment, the entire memory could be configured as flexible memory, divided into multiple MEE regions. At startup, the entire memory starts as non-secure and system software may convert it as guided by the demand for secure memory on the system. EPC sections of the main memory are further described below and illustrated with respect to FIG. 2.

With reference to FIG. 1, the processor device 100 may execute instructions to identify and request access to memory pages from the MEE regions as guided by software executing on the processing device 100, such as an operating system (OS) or a virtual machine monitor (VMM), as described herein. The processor device 100 may support virtual address spaces comprising memory locations of the requested memory pages. The memory space locations may be referenced by instructions, including load and store instructions, using virtual addresses. The virtual addresses in turn get translated into physical addresses in the main memory. In one embodiment, the MEU 130 may generate and retrieve data and other information to satisfy these memory requests of the processor device 100 by translating the virtual address of the memory request to a physical address.

The MEU 130 may include, among other things, a cache unit 150, a translation-lookaside buffer (TLB) 155 and a page-miss handler (PMH) 160. The cache unit 150 may include, but is not limited to, level one (L1), level two (L2) and/or a last level cache, or any other configuration of cache memory within the processing device 120. In some implementations, L2 and other cache levels, such as last level cache, may be located off of the processing device 100. As shown, the cache unit 150 can be integrated into the processing device 100. Alternatively, the cache unit 150 may be coupled to the processing device 100, for example, by a shared bus. The cache unit 150 may store data (e.g., including instructions) that are utilized by one or more components of the processing device 100. For example, the cache unit 150 may locally cache data stored in the TLB 155 for faster access by the components of the processing device 100. Various components of the processor 100 may communicate with the cache unit 150 directly, through a bus and/or memory controller or a hub.

The TLB 155 maintains a mapping of address translation between virtual addresses and corresponding physical addresses. When a memory access request is received, such as for a convertible page, the request may be intercepted by the MEU 130 which performs a lookup on the TLB 155. The look up may determine whether the TLB 155 contains the physical address corresponding to the virtual address of the convertible page. If the address translation is found, a TLB hit occurs. On memory access that result in a TLB miss, MEU 130 may notify the PMH 160 to perform a page table walk to determine the physical address corresponding to the virtual address of the convertible page.

In some embodiments, when the PMH 160 preforms a page table walk to determine the corresponding physical address of the page, the PMH 160 may inspect a PTE of a page table to determine EPI of that page. A page table is a data structure used in virtual memory system to maintain, via PTEs of the page table, a mapping between virtual addresses and physical addresses in a computer system. For example, the virtual address of the page table may be associated with a memory page of a guest operating system and this address may map to a physical address location associated with main memory. Each entry of the page table or PTE may include address information for mapping the virtual addresses and physical addresses.

In some embodiments, the page table walk may be performed via EPI Logic 165. Embodiments described herein may be implemented as a set of instructions in the EPI Logic 165 of the PMH 160. Upon a TLB miss, the MEU 130 may direct the PMH 160 to execute a page walk on a page table in order to load the appropriate physical address translation from main memory and into the TLB 155. The PMH 160 walks the page table to identify the PTE corresponding to the physical address. Once successfully obtained, the PMH 160 may utilize the EPI Logic 165 (i.e., modules or instructions) to instruct the PMH 160 to inspect a determined bit of the PTE that indicates whether the page is to be used as a secure page or non-secure page and to load this information in the TLB 155 for the page. As noted above, this determined bit of the PTE may be set by the system software, such as an operating system or virtual machine monitor. In some embodiments, the instructions in the EPI Logic 165 may be executed by the processor core(s) 110 of processing device 100. The instructions as executed by the processing core(s) 110 and the memory as described above can be used, for example, with a system on a chip.

Figure 2:
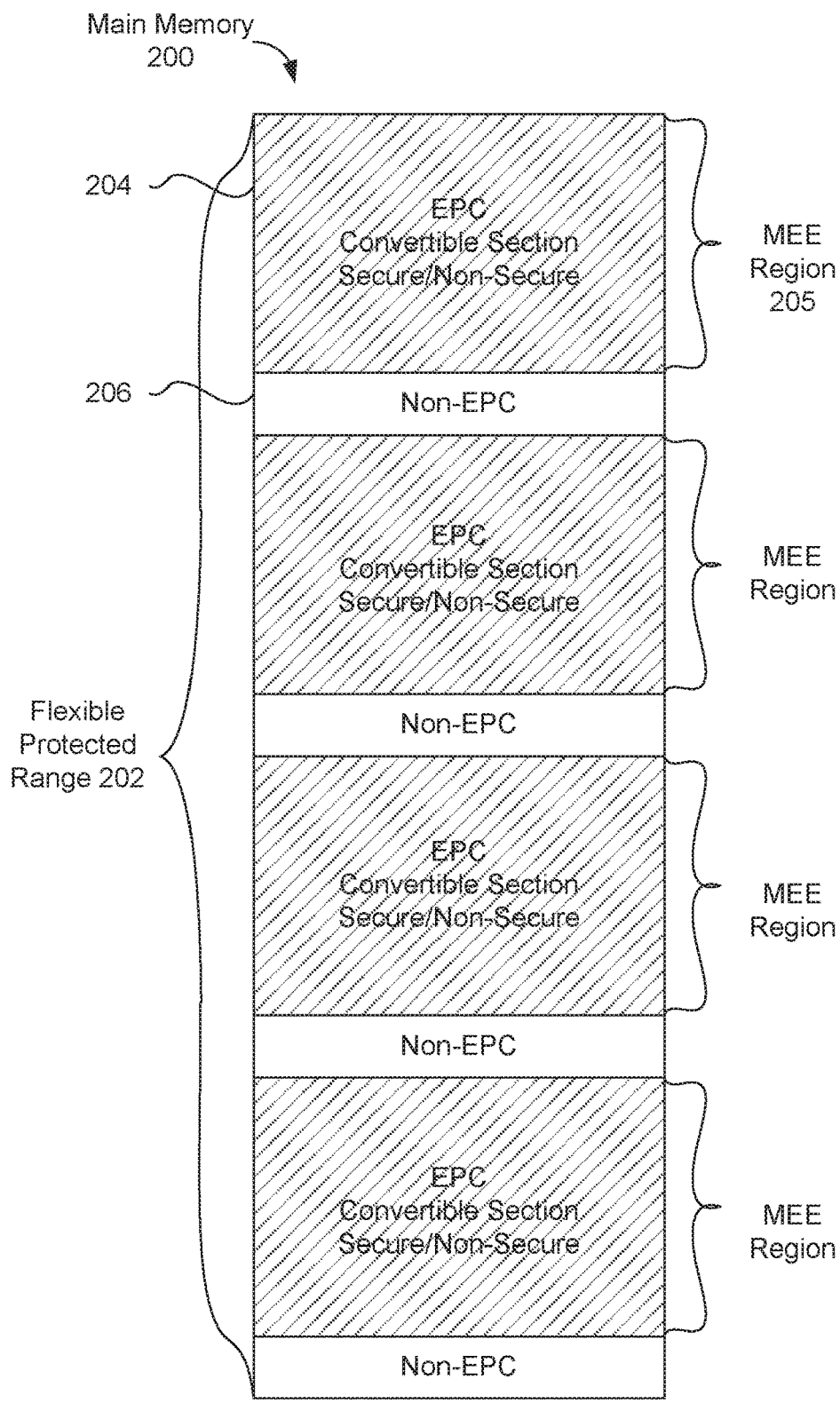
FIG. 2 illustrates convertible and non-convertible sections of main memory and non-convertible sections in a flexible protected range according to one embodiment.

FIG. 2 illustrates main memory 200 in a flexible-EPC protected range 202 according to one embodiment. As noted above, with flexible-EPC, MEE regions of the main memory 200, such as MEE region 205, are convertible. For example, convertible memory pages within EPC section 204 can be converted from non-secure to secure, and vice-versa. The memory outside of the MEE region 205, namely, non-EPC memories, such as non-EPC 206, are maintained as non-secure and may not be converted to secure. Embodiments of the disclosure may use a determined bit of the PTE to track the current security state or EPI of convertible memory pages within the EPC section 204.

Figure 3:
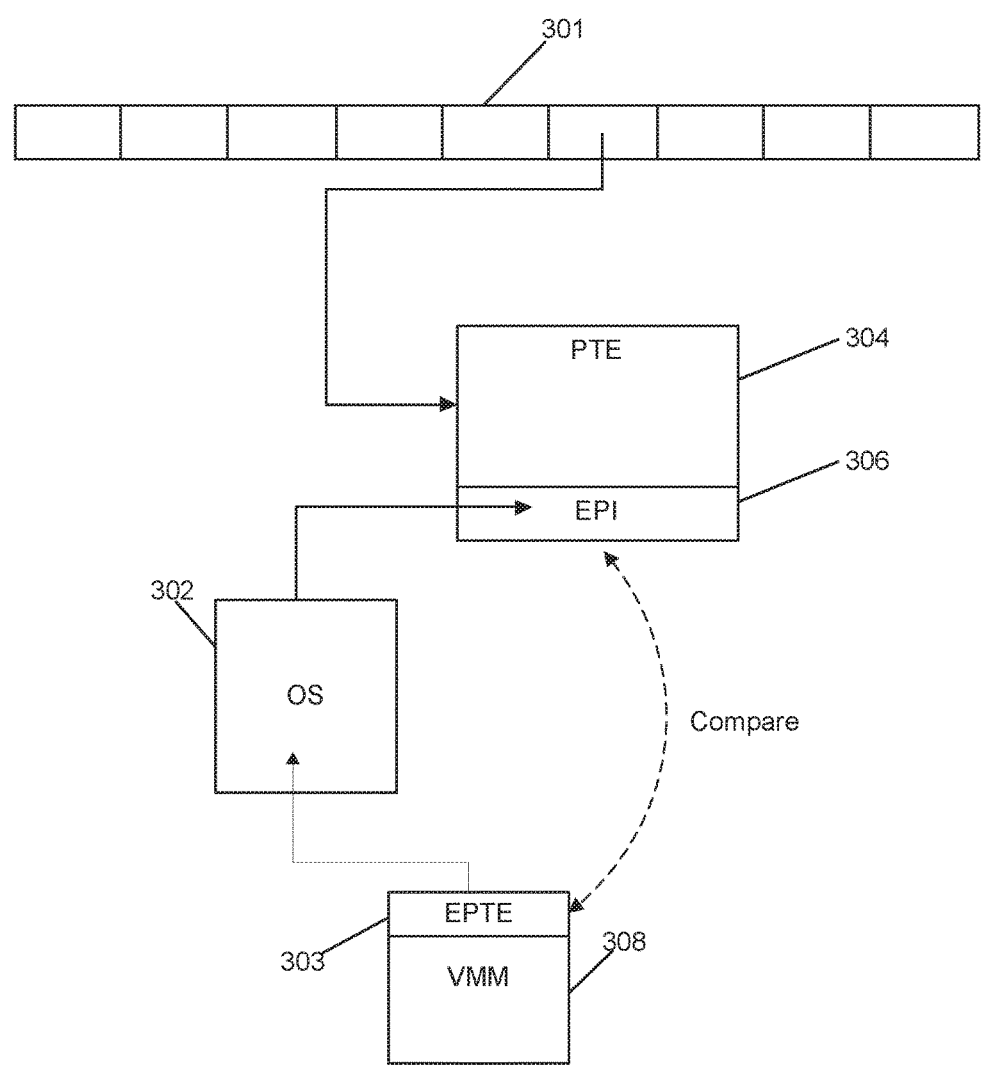
FIG. 3 illustrates a system for supporting secure memory intent according to one embodiment.

FIG. 3 illustrates a block diagram of a system 300 for supporting secure page intent according to one embodiment. As noted above, system software, such as OS 302, of a processing device specifies the EPI 306 of each page in an entry of a page table 301. For example, the OS 302 may use a bit in a PTE 304, such as EPI bit indicator 306 to indicate whether a related convertible page is to be accessed as either a secure or non-secure page. However, prescribing a particular bit in the PTE 304 to be used to indicate the EPI can be somewhat restrictive as different system software can use available bits in the PTE 304 in different ways. In some embodiments, the system software may be enabled to determine which bit in the PTE 304 may be used for indicating EPI 306.

In one embodiment, the OS 302 specifies a bit in PTE 304 for indicating the EPI 306. For example the OS 302 may use a model-specific register (MSR) for the EPI bit specification. The MSR may be a set of registers that are defined for a specific processor or set of processors. For at least one embodiment, for example, MSRs for an Intel® Architecture, 32-bit (IA32) processor may be utilized for this purpose.

The MSR may be accessed by the OS 302 to specify a bit in the PTE 304 for indicating EPI 306 for a related page. One MSR is an IA32_SGX_PTE_EPI_SELECT register. This MSR may be used by an OS 302 to indicate the bit in the PTE 304 for indicating the EPI 306. In one implementation, one bit may be set in this MSR. Another MSR is an IA32_SGX_PTE_EPI_FIXED0 register. This MSR may be a read-only register used by system hardware to specify the bits in PTE 304. In one example, the OS 302 may read this read-only register to determine which bit in PTE 304 to use for EPI 306. Both MSRs may be 64-bit wide to allow for greater flexibility.

On a system where the OS 302 runs under the control of a VMM, such as VMM 308, the VMM 308 can choose the bits to indicate the EPI of a convertible page independently of the OS. In one embodiment, the OS 302 may be a guest operating system of a virtual machine (VM) managed by VMM 308. The VMM 308 may specify a bit in an extended page table (EPTE) 303 for pages mapped to OS 302. The EPTE 303 is controlled by the VMM 308 to map pages to the OS 302. In one implementation, one bit in the EPTE 303 is set and that bit cannot be set to 0, because if the page mapped through the EPTE 303 is not a secure page, the EPI of the page should be 0. If the bit in the EPTE 303 is set incorrectly, this may result in a fault. In some embodiments, if the OS 302 leaves the IA32_SGX_PTE_EPI_SELECT register clear, then the bit in the EPTE 303 specified by the VMM 308 is used as the EPI of the convertible page.

In some embodiments, the EPI of a convertible page is controlled by a combination of the EPI 306 in PTE 304 set by the OS 302 and the EPTE 303 set in the VMM 308. For example, if they match, they define the EPI of the corresponding page. If they do not match, then an access of the page may result in access violation that causes a VM exit. Upon receiving the VM exit, the VMM 308 may terminate the OS 302 because it may be executing an invalid operation or malfunctioning.

Figure 4:
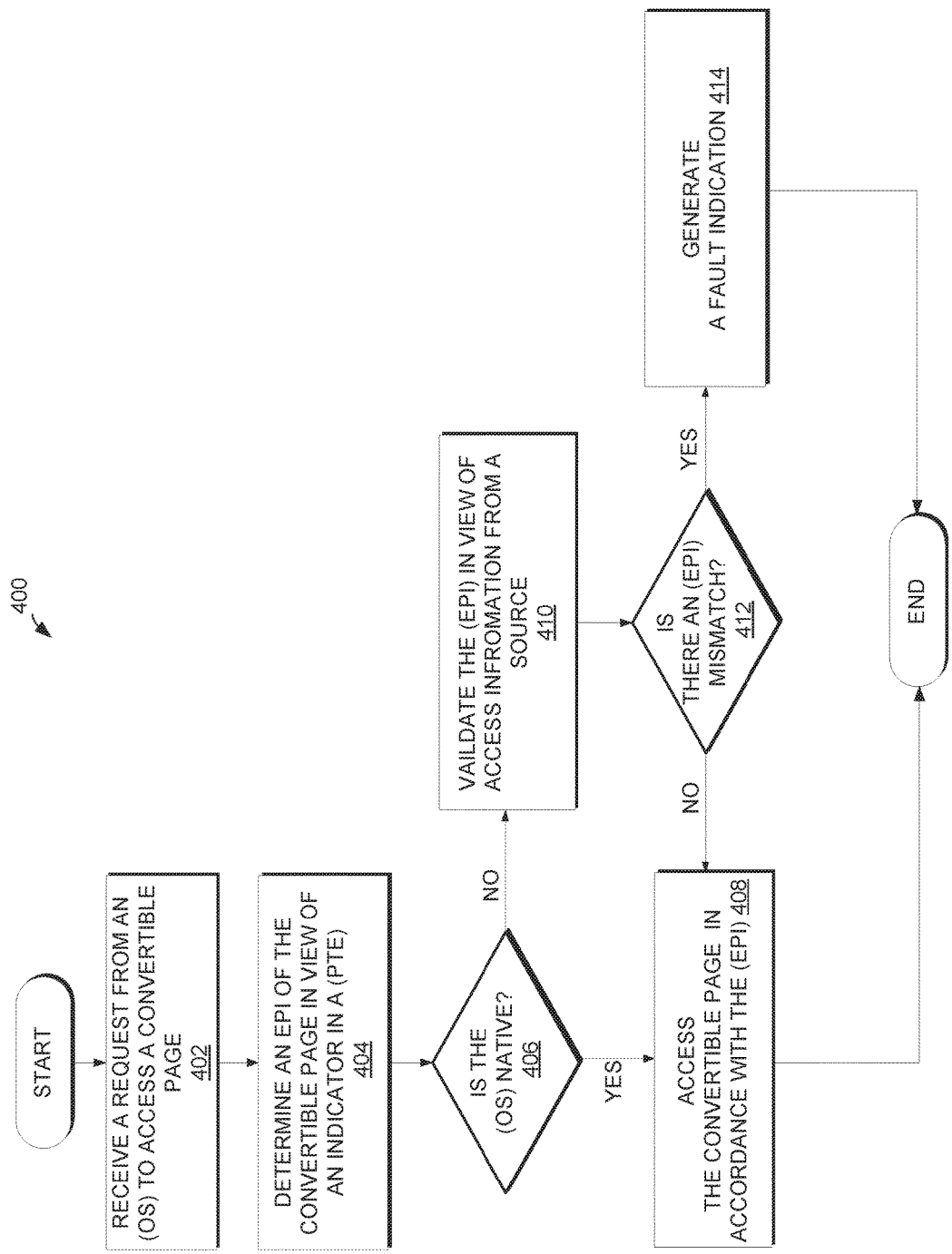
FIG. 4 illustrates a flow diagram of a method to support secure memory intent according to one embodiment.

FIG. 4 is a flow diagram illustrating a method 400 for implementing access control instructions of a processing device to support secure memory intent according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the MEU 130 in processing device 100 of FIG. 1 using EPI Logic 165. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 400 begins at block 402 where a request from an operating system (OS) to access a convertible page may be received. For example, MEU 130 may receive a request from the OS to access a page that is located in a convertible memory range of main memory 200. EPI for the convertible page may be determined at block 404 in view of an indicator in a PTE. For example, a bit set in the PTE for the convertible page may indicate whether that page is to be accessed as a secure page or non-secure page.

Block 406 branches depending on whether the OS is native. For example, if the OS is running natively (e.g., the OS is a main or host operating system) on processing device 100, the EPI of the page is determined by the OS alone. In this case, method 400 may proceed to block 408. At block 408, the convertible page may be accessed in accordance with the EPI. For example, if a bit is set in the PTE, the EPI of the convertible page is secure and if the bit is clear, the EPI is non-secure. It should be noted that if the access request is for a page of an EPC, the EPI for that page should be set. Otherwise, a fault is generated. For a non-EPC page access request, the EPI bit should be clear, indicating that the page is non-secure (otherwise a fault is generated).

If the OS is not native, method 400 may proceed to block 410. For example, the OS may be a guest operating system running under the control of a VMM. At block 410, the EPI may be validated in view of information for a source. For example, the EPI set in the PTE may be compared to information in a corresponding EPTE of the VMM. As noted above, the EPTE is controlled by the VMM to map pages to the guest operating system. This information in the EPTE may be set by the VMM of the computer system. At block 412, it may be determined whether there is an EPI mismatch. For example, there may be an EPI mismatch when the EPI in the PTE does not correspond to the information set by the VMM in the EPTE. If the EPI is valid and not a mismatch, method 400 may process to block 408 to access the convertible page in accordance with the EPI. Otherwise, method 400 may process to block 414.

At block 414, a fault indication may be generated. In one embodiment, the MEU 130 may indicate that there is an EPI mismatch between OS and VMM. This helps protect the VMM from a misbehaving OS. If the information set by the OS in the PTE does not correspond to the information set by the VMM in the EPTE, an EPT violation may be generated causing a VM exit for the VM hosting the guest operating system.

Figures 5A, 5B:
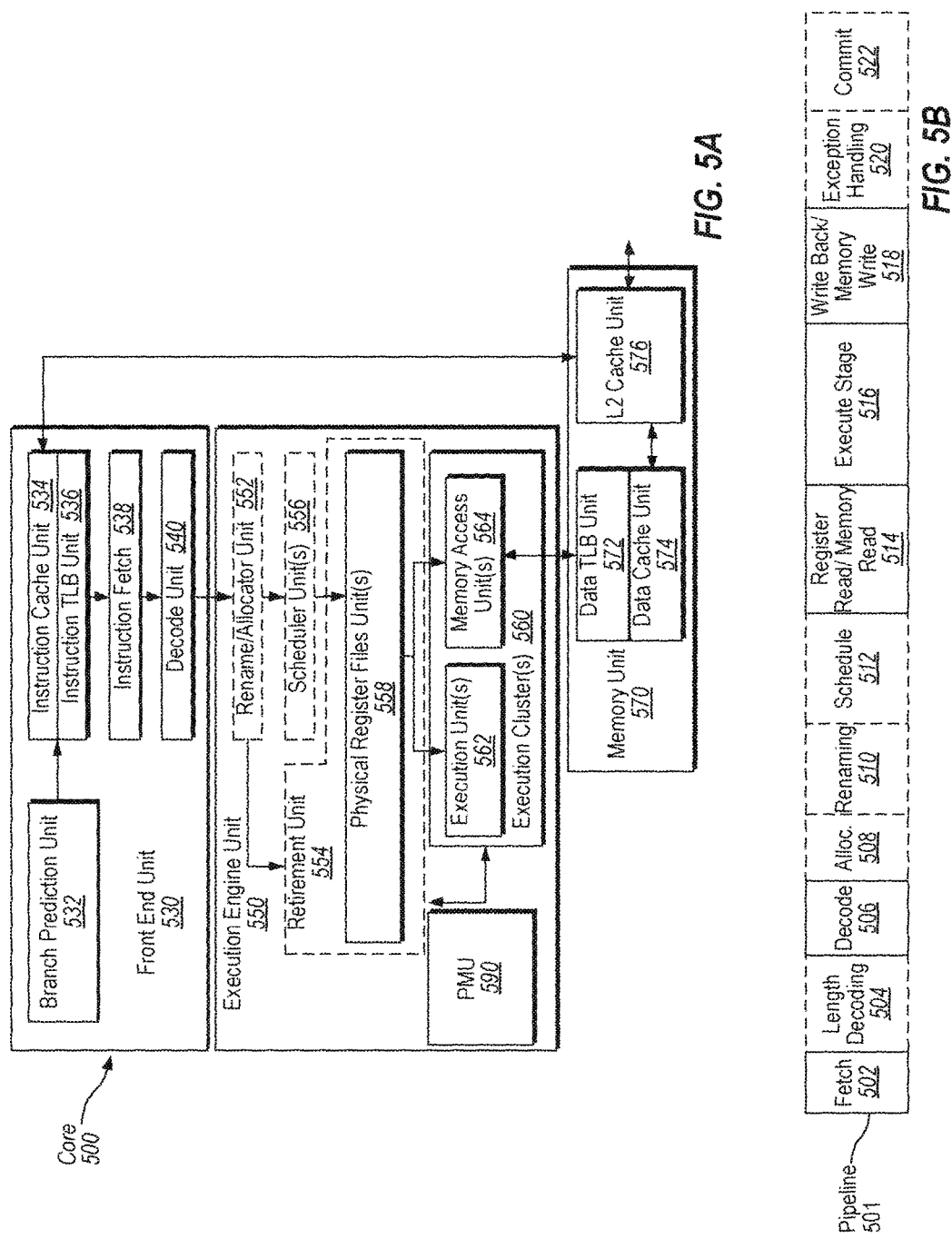
FIG. 5A is a block diagram illustrating a micro-architecture for a processor according to one embodiment.
FIG. 5B is a block diagram illustrating an in-order pipeline and a register renaming stage, out-of-order issue/execution pipeline according to one embodiment.

FIG. 5A is a block diagram illustrating a micro-architecture for a processor 500 that implements techniques to support secure memory intent in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 550 may include for example a power management unit (PMU) 590 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 500 may be the same as processing device 100 described with respect to FIG. 1. In particular, the data TLB unit 572 may be the same as TLB 155 and described with respect to FIG. 1, to implement secure memory intent in a processing device described with respect to implementations of the disclosure.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 501 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 520, and a commit stage 522. In some embodiments, the ordering of stages 502-524 may be different than illustrated and are not limited to the specific ordering shown in FIG. 5B.

Figure 6:
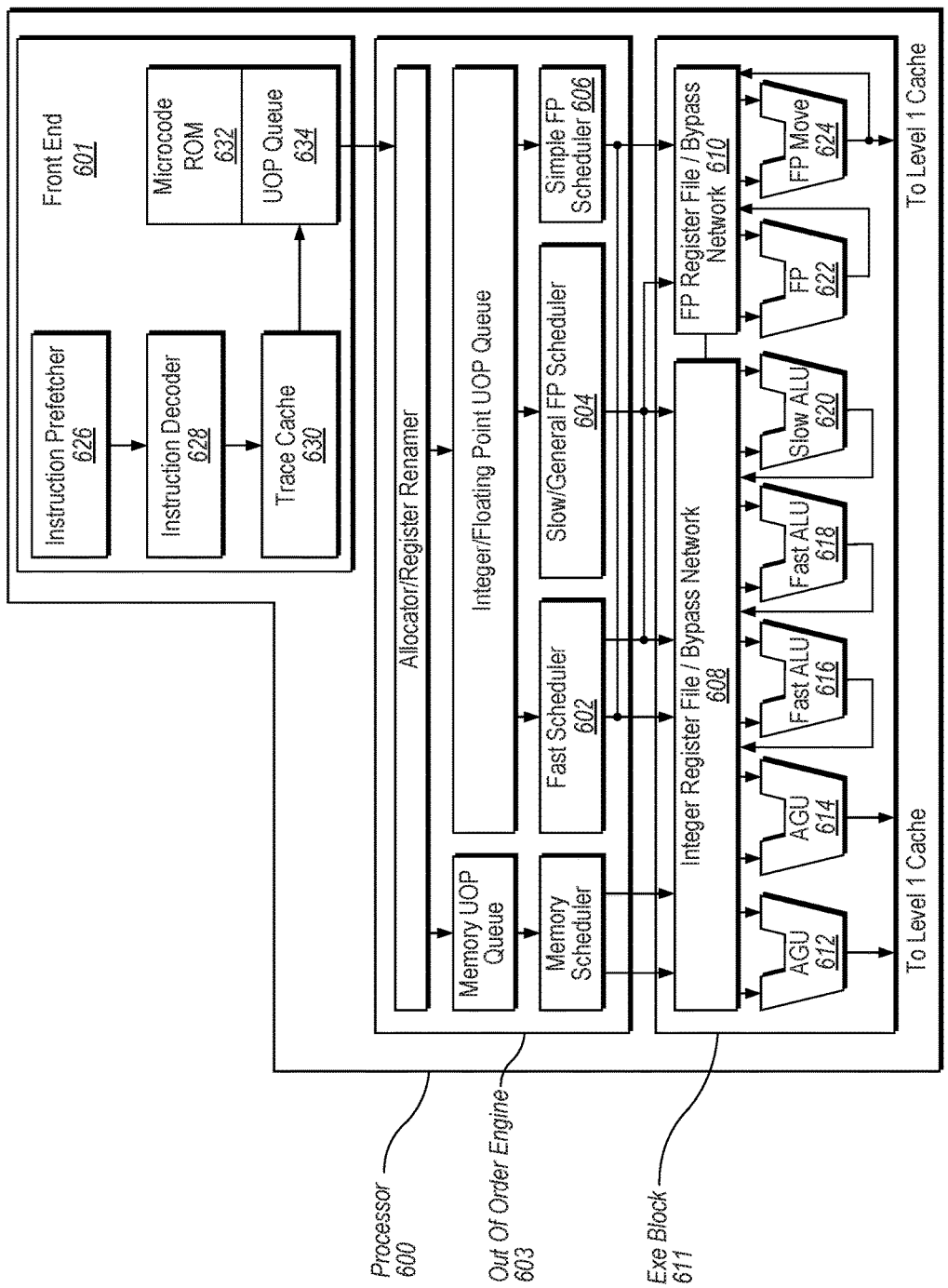
FIG. 6 is a block diagram illustrating a computer system according to one implementation.

FIG. 6 illustrates a block diagram of the micro-architecture for a processor 600 that includes logic circuits to implement secure memory intent in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing secure memory intent.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
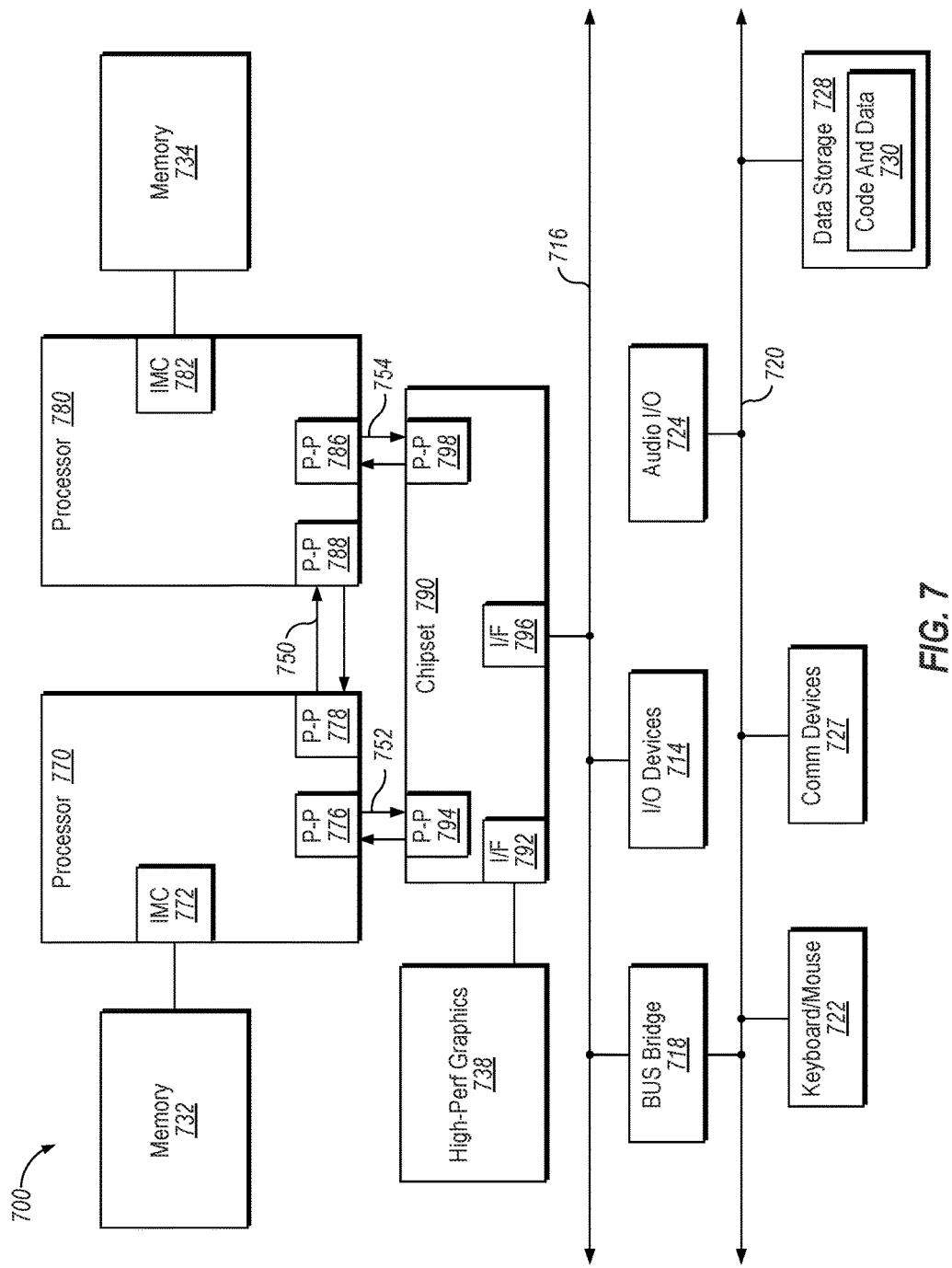
FIG. 7 is a block diagram illustrating a system in which an embodiment of the disclosure may be used.

Embodiments may be implemented in many different system types. Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement secure memory intent as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
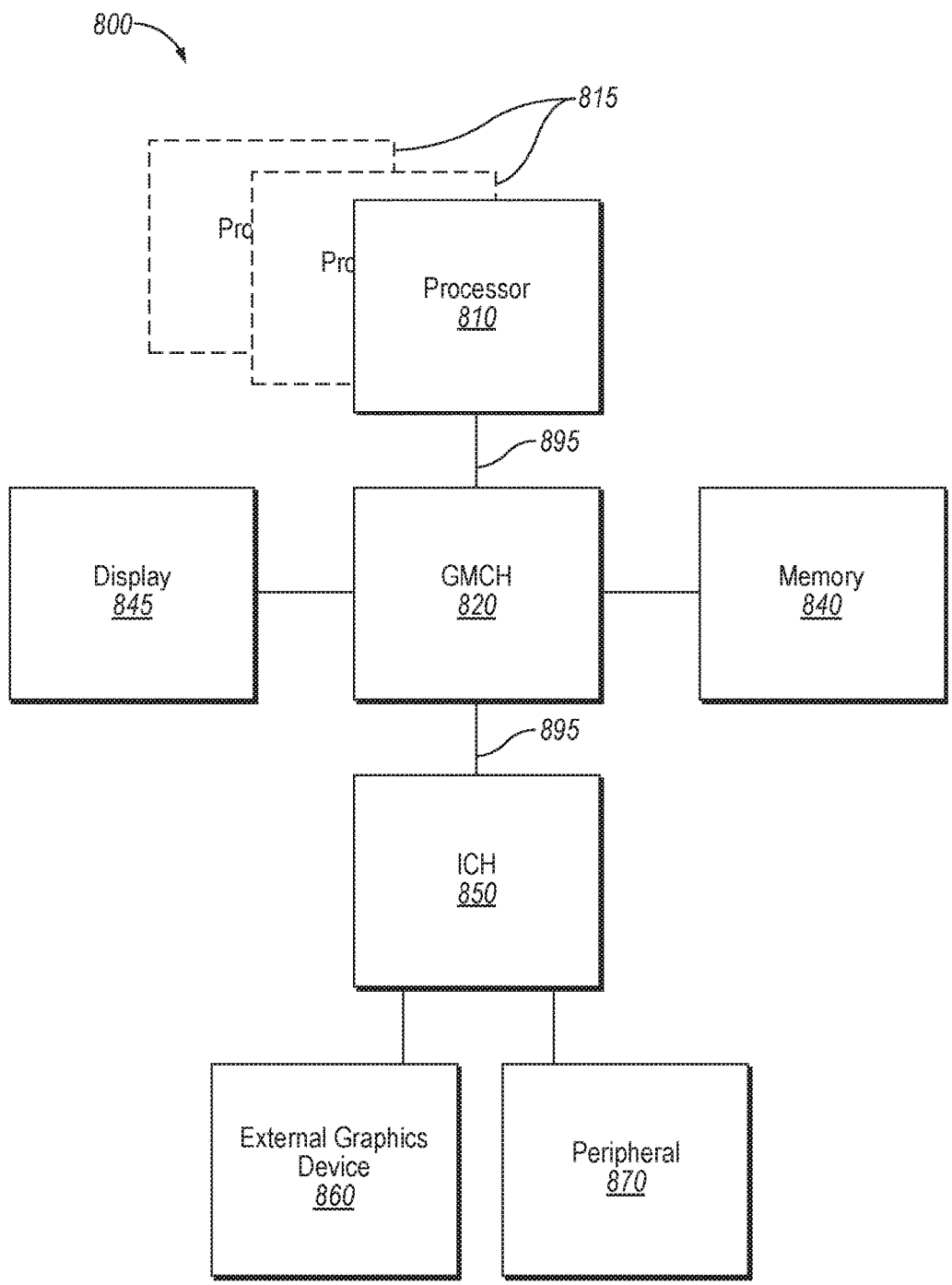
FIG. 8 is a block diagram illustrating a system in which an embodiment of the disclosure may be used.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement secure memory intent according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
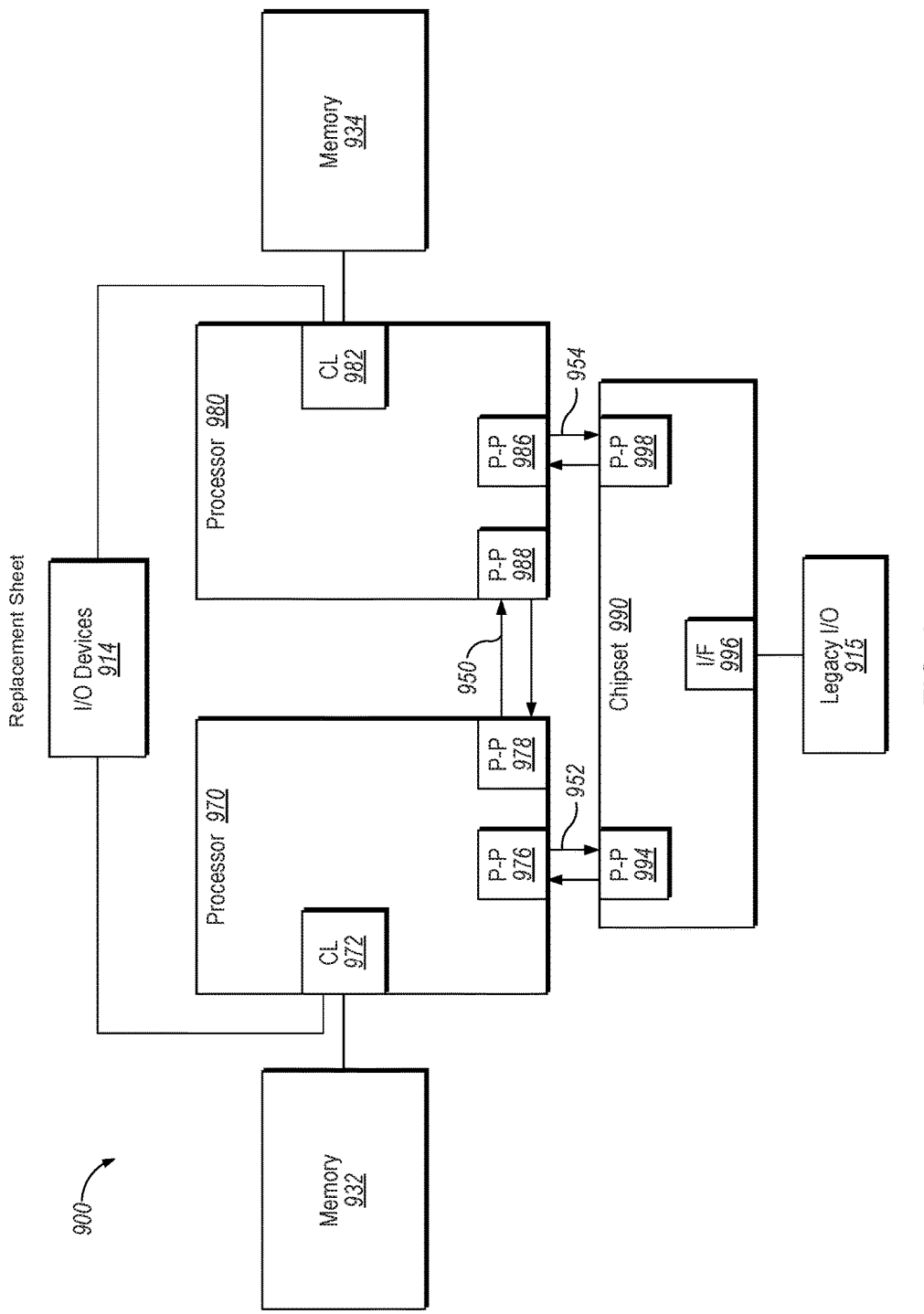
FIG. 9 is a block diagram illustrating a system in which an embodiment of the disclosure may be used.

Referring now to FIG. 9, shown is a block diagram of a system 900 in which an embodiment of the disclosure may operate. FIG. 9 illustrates processors 970, 980. In one embodiment, processors 970, 980 may implement secure memory intent as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
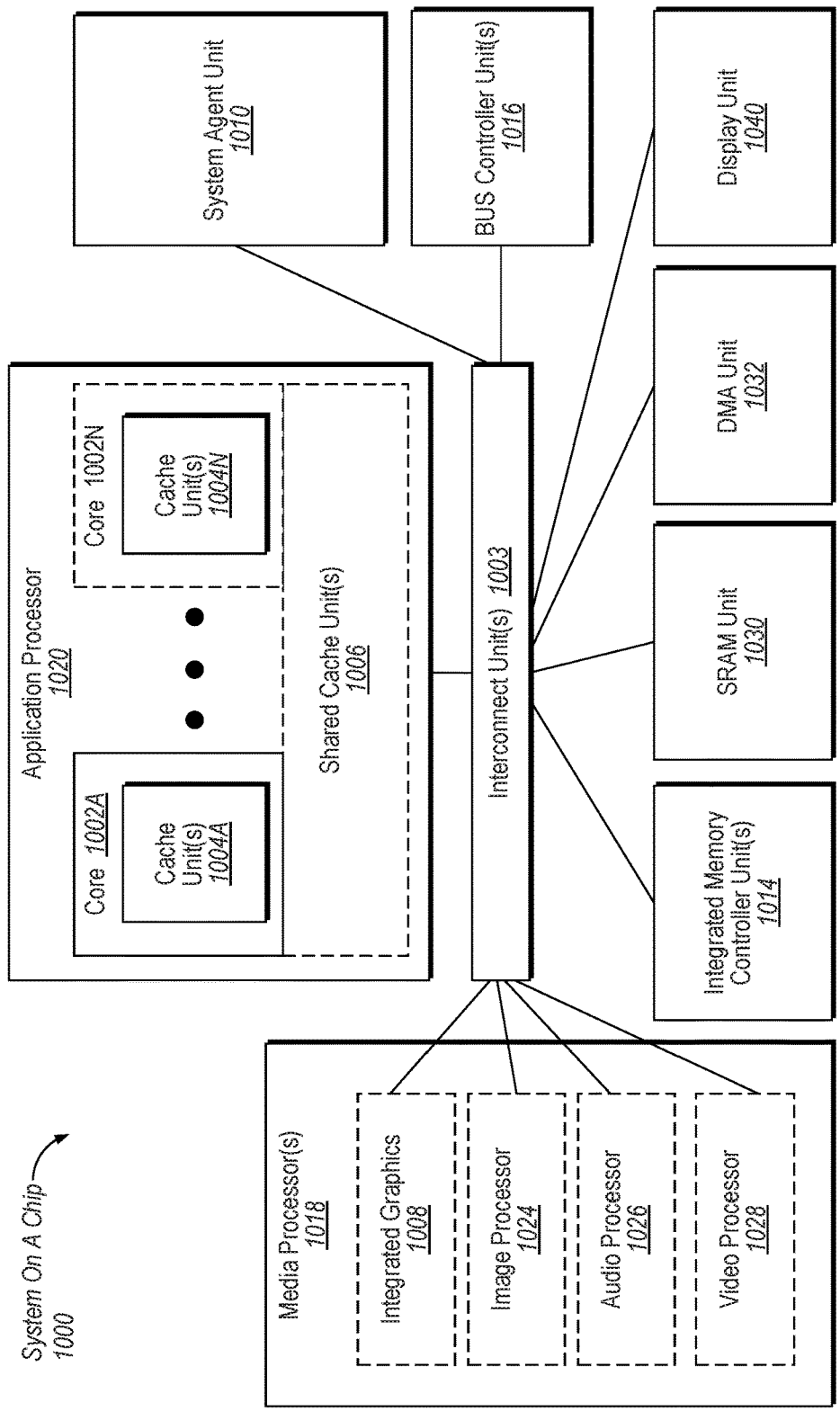
FIG. 10 is a block diagram illustrating a System-on-a-Chip (SoC) in which an embodiment of the disclosure may be used.

Embodiments may be implemented in many different system types. FIG. 10 is a block diagram of a SoC 1000 in accordance with an embodiment of the disclosure. Dashed lined boxes are optional features on more advanced SoCs. In FIG. 10, an interconnect unit(s) 1003 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a PMU for implementing silent memory instructions and miss-rate tracking to optimize switching policy on threads as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multithreading. The system agent unit 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
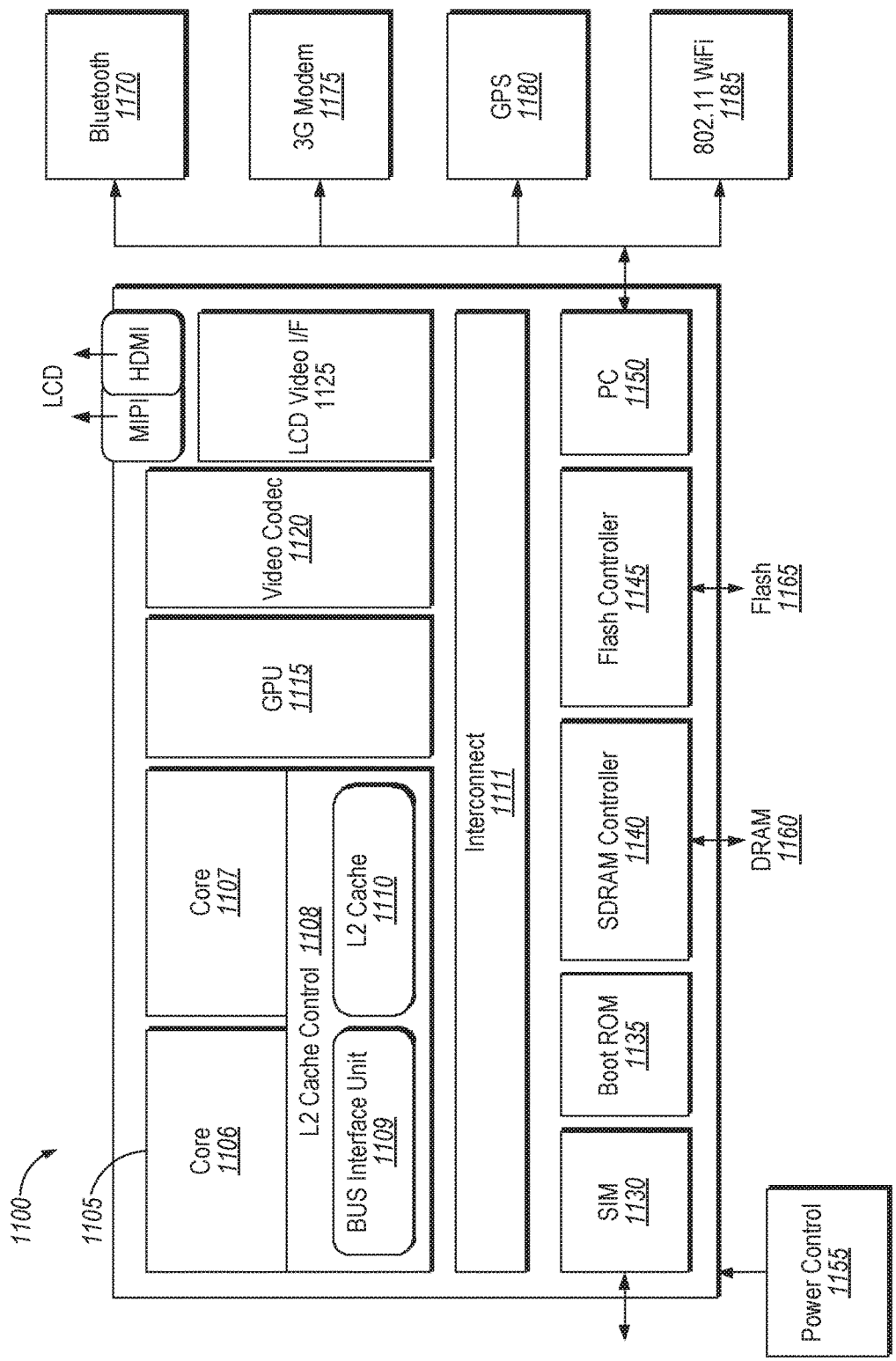
FIG. 11 is a block diagram illustrating a SoC design in which an embodiment of the disclosure may be used.

FIG. 11 is a block diagram of an embodiment of a system on-chip (SoC) design in accordance with the disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement secure memory intent as described in embodiments herein.

Interconnect 1110 provides communication channels to the other components, such as a Subscriber Identity Module (SIM) 1130 to interface with a SIM card, a boot ROM 1140 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a power control module 1155, a Bluetooth module 1170, 3G modem 1175, GPS 1180, and Wi-Fi 1185.

Figure 12:
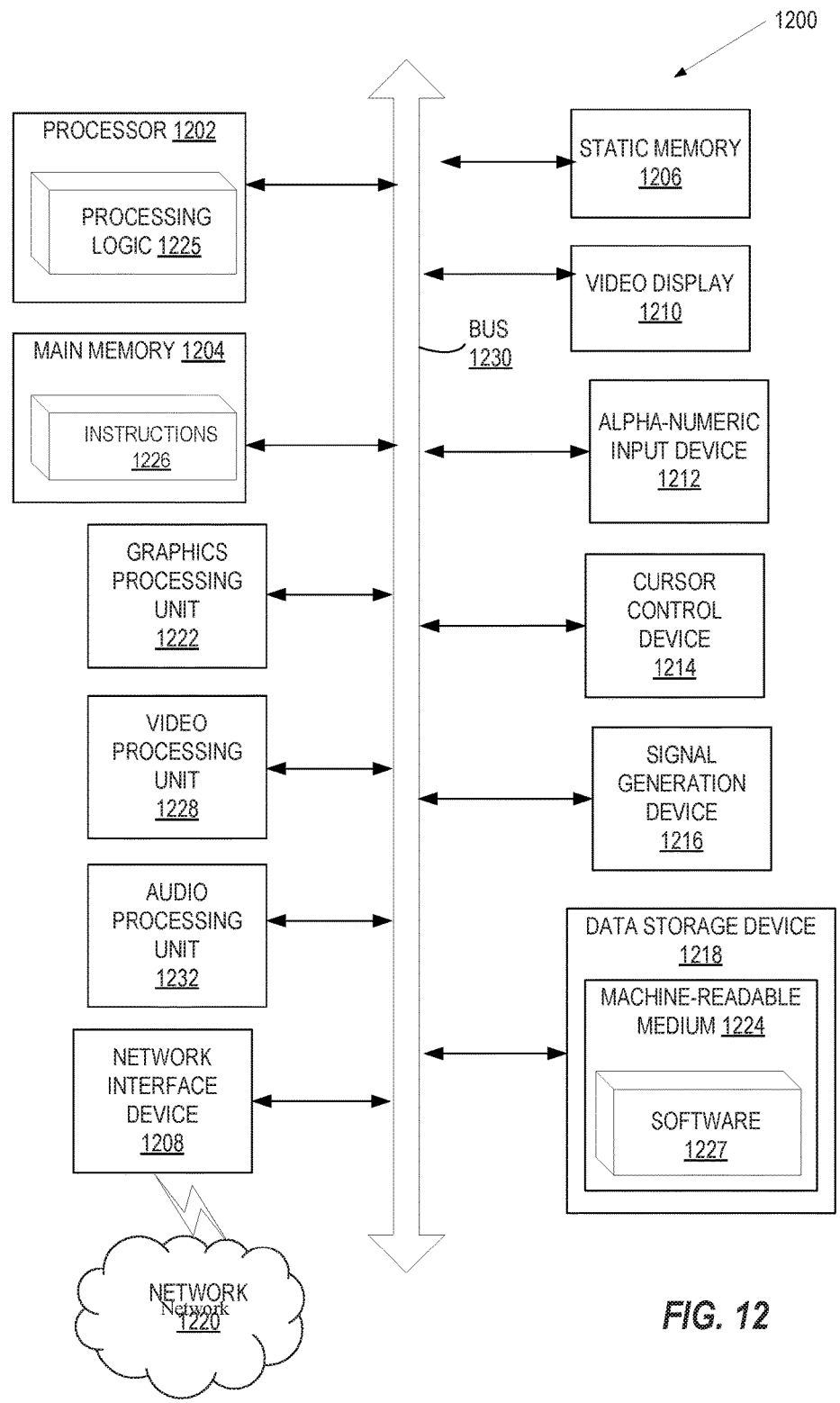
FIG. 12 illustrates a block diagram illustrating a computer system in which an embodiment of the disclosure may be used.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1225 for performing the operations and steps discussed herein. In one embodiment, processing device 1202 is the same as processor architecture 100 described with respect to FIG. 1 that implements secure memory intent as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1227 implementing any one or more of the methodologies of functions described herein, such as implementing silent memory instructions and miss-rate tracking to optimize switching policy on threads in a processing device as described above. The software 1227 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing silent memory instructions and miss-rate tracking to optimize switching policy on threads in a processing device such as described with respect to processing device 100 in FIG. 1, and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processor comprising: 1) a memory execution unit to access memory and a processor core coupled to the memory execution unit. The processor core is to: a) receive a request to access a convertible page from the memory; b) in response to the request, determine an intent for the convertible page in view of a page table entry (PTE) corresponding to the convertible page. The intent indicates whether the convertible page is to be accessed as at least one of a secure page or a non-secure page.

In Example 2, the subject matter of Example 1, wherein the processor core is further to access the convertible page in accordance with the intent.

In Example 3, the subject matter of any one of Examples 1-2, wherein the processor core is further to validate the intent in view of information for the convertible page from a source.

In Example 4, the subject matter of any one of Examples 1-3, wherein the information indicates whether to access the convertible page as a secure page or non-secure page.

In Example 5, the subject matter of any one of Examples 1-4, wherein to validate the intent the processor core is further to compare the intent with the information for the convertible page.

In Example 6, the subject matter of any one of Examples 1-5, wherein the processor core is further to responsive to a match between the intent and the information, access the convertible page.

In Example 7, the subject matter of any one of Examples 1-6, wherein the processor core is further to responsive to a difference between the intent and the information, generate an alert.

In Example 8, the subject matter of any one of Examples 1-7, wherein the processor core is further to a) validate an address corresponding to the convertible page and b) determine whether a secure bit indicator associated with the address is set or clear.

Various embodiments may have different combinations of the structural features described above. For instance, all optional features of the processor described above may also be implemented with respect to a method or process described herein and specifics in the examples may be used anywhere in one or more embodiments.

Example 9 is a method comprising 1) receiving, by a processing device, an request to access a convertible page from memory; 2) in response to the request, determining an intent for the convertible page in view of a page table entry (PTE) corresponding to the convertible page. The intent indicating whether the convertible page is to be accessed as at least one of a secure page or a non-secure page.

In Example 10, the subject matter of Example 9, further comprising accessing the convertible page is accordance with the intent.

In Example 11, the subject matter of any one of Example 9-10, further comprising validating the intent in view of information for the convertible page from a source.

In Example 12, the subject matter of any one of Example 9-11, wherein the information indicating whether to access the convertible page as a secure page or non-secure page.

In Example 13, the subject matter of any one of Example 9-12, wherein validating the intent further comprises comparing the intent with the information for the convertible page.

In Example 14, the subject matter of any one of Example 9-13, further comprising responsive to a match between the intent and the information, accessing the convertible page.

In Example 15, the subject matter of any one of Example 9-14, further comprising responsive to a difference between the intent and the information, generating an alert.

In Example 16, the subject matter of any one of Example 9-15, wherein determining the intent for the convertible page further comprises: a) validating an address corresponding to the convertible page; and b) determining whether a secure bit indicator associated with the address is set or clear.

Various embodiments may have different combinations of the structural features described above. For instance, all optional features of the processors and methods described above may also be implemented with respect to a system described herein and specifics in the examples may be used anywhere in one or more embodiments.

Example 17 is a system comprising 1) a memory to store a plurality of convertible pages; and 2) a memory execution unit (MEU) coupled to the memory. The MEU to a) receive a request to access a convertible page from the memory; and b) in response to the request, determine an intent for the convertible page in view of a page table entry (PTE) corresponding to the convertible page. The intent indicates whether the convertible page is to be accessed as at least one of a secure page or a non-secure page.

In Example 18, the subject matter of Example 17, wherein the MEU is further configured to access the convertible page is accordance with the intent.

In Example 19, the subject matter of any one of Examples 17-18, wherein the MEU is further configured to validate the intent in view of information for the convertible page from a source.

In Example 20, the subject matter of any one of Examples 17-19, wherein the information indicates whether to access the convertible page as a secure page or non-secure page.

In Example 21, the subject matter of any one of Examples 17-20, wherein the MEU is further to validate the intent the processor to compare the intent with the information for the convertible page.

In Example 22, the subject matter of any one of Examples 17-21, wherein the MEU is further to responsive to a match between the intent and the information, access the convertible page.

In Example 23, the subject matter of any one of Examples 17-22, wherein the MEU is further to responsive to a difference between the intent and the information, generate an alert.

In Example 24, the subject matter of any one of Examples 17-23, wherein to determine the access intent for the convertible page the MEU is further configured to: a) validate an address corresponding to the convertible page; and b) determine whether a secure bit indicator associated with the address is set or clear.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 25 is a non-transitory, computer-readable storage medium including instructions that when executed by a processor, cause the processor to: a) receive a request to access a convertible page of the memory, and b) in response to the request, determine an intent for the convertible page in view of a page table entry (PTE) corresponding to the convertible page. The intent indicates whether the convertible page is to be accessed as at least one of a secure page or a non-secure page.

In Example 26, the subject matter of Example 25, wherein the executable instructions cause the processing device further to access the convertible page in accordance with the intent.

In Example 27, the subject matter of any one of Examples 25-26, wherein the executable instructions cause the processing device further to validate the intent in view of information for the convertible page from a source.

In Example 28, the subject matter of any one of Examples 25-27, wherein the information indicates whether to access the convertible page as a secure page or non-secure page.

In Example 29, the subject matter of any one of Examples 25-28, wherein executable instructions to validate the intent comprise executable instructions causing the processing device to compare the intent with the information for the convertible page.

In Example 30, the subject matter of any one of Examples 25-29, wherein the executable instructions, cause the processing device to responsive to a match between the intent and the information, access the convertible page.

In Example 31, the subject matter of any one of Examples 25-30, wherein the executable instructions, cause the processing device further to responsive to a difference between the intent and the information, generate an alert.

In Example 32, the subject matter of any one of Examples 25-31, wherein executable instructions to determine the intent for the convertible page comprise executable instructions causing the processing device to: a) validate an address corresponding to the convertible page; and b) determine whether a secure bit indicator associated with the address is set or clear.

Example 33 is a non-transitory, computer-readable storage medium including instructions that, when executed by a processor, cause the processor to perform the method of Examples 9-16.

Various embodiments may have different combinations of the operational features described above.

Example 34 is a system comprising a system on chip (SoC) comprising a plurality of functional units and a memory controller unit (MCU) coupled to the plurality of functional units, wherein the MCU comprises a memory execution unit (MEU), wherein the MEU is configured to perform the method of Examples 9-16.

In Example 35, the subject matter of Example 34, wherein the SoC further comprises the subject matter of any of Examples 1-8 and 17-24.

Example 36 is an apparatus comprising: 1) a plurality of functional units of a processor; 2) means for receiving a request to access a convertible page in main memory; and 3) means for determining an intent for the convertible page in view of a page table entry (PTE) corresponding to the convertible page. The intent indicates whether the convertible page is to be accessed as at least one of a secure page or a non-secure page.

In Example 37, the subject matter of Example 36, further comprising the subject matter of any of Examples 1-7 And 14-20.

Example 38 is a system comprising: a memory device and a processor comprising a memory execution unit (MEU), wherein the MEU is configured to perform the method of any of Examples 9-16.

In Example 39, the subject matter of Example 38, further comprising the subject matter of any of Examples 1-8 and 17-24.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
a memory execution unit to access memory; and
a core, operatively coupled to the memory execution unit, to:
   receive, from an operating system, a request to access a convertible page of the memory;
   identify a register associated with the convertible page of the memory;
   determine an intent for the convertible page based on a bit value in the register, wherein the intent indicates whether the convertible page is to be accessed as at least one of a secure page or a non-secure page;

in response to a determination that the operating system is a host operating system, access the convertible page in accordance with the intent;

in response to a determination that the operating system is a guest operating system, compare the intent with information for the convertible page from a source; and in response to detection of a match between the intent and the information for the convertible page, access the convertible page.

2. The processing device of claim 1, wherein, in response to a determination that the operating system is the guest operating system, the core is further to determine whether the intent matches information in an extended page table entry (EPTE) for the convertible page.

3. The processing device of claim 2, wherein the core is further to responsive to detecting a difference between the intent and the information, generate an alert.

4. The processing device of claim 1, wherein to determine the intent for the convertible page the core is further to:
identify an address corresponding to the convertible page; and
determine whether a secure bit indicator associated with the address is set or clear.

5. A method, comprising:
receiving, from an operating system, a request to access a convertible page of the memory;
identifying, by a processing device, a register associated with a convertible page of a memory;
determining, by the processing device, an intent for the convertible page based on a bit value in the register, wherein the intent indicates whether the convertible page is to be accessed as at least one of a secure page or a non-secure page;
in response to a determination that the operating system is a host operating system, accessing, by the processing device, the convertible page in accordance with the intent;
in response to a determination that the operating system is a guest operating system, comparing the intent with information for the convertible page from a source; and
in response to detection of a match between the intent and the information for the convertible page, accessing the convertible page by the processing device.

6. The method of claim 5, further comprising, in response to a determination that the operating system is the guest operating system, determining whether the intent matches information in an extended page table entry (EPTE) for the convertible page.

7. The method of claim 6, further comprising, responsive to detecting a difference between the intent and the information, generating an alert.

8. The method of claim 5, wherein determining the intent for the convertible page further comprises:
identifying an address corresponding to the convertible page; and
determining whether a secure bit indicator associated with the address is set or clear.

9. A system comprising:
a memory to store a plurality of convertible pages; and
a memory execution unit (MEU), operatively coupled to the memory, to:
receive, from an operating system, a request to access a convertible page of the memory;
identify a register associated with a convertible page of the memory;
determine an intent for the convertible page based on a bit value in the register, wherein the intent indicates whether the convertible page is to be accessed as at least one of a secure page or a non-secure page;
in response to a determination that the operating system is a host operating system, access the convertible page in accordance with the intent;
in response to a determination that the operating system is a guest operating system, compare the intent with information for the convertible page from a source; and
in response to detection of a match between the intent and the information for the convertible page, access the convertible page.

10. The system of claim 9, wherein the MEU is further to, in response to a determination that the operation system is the guest operating system, determine whether the intent matches information in an extended page table entry (EPTE) for the convertible page.

11. The system of claim 10, wherein the MEU is further to, in response to detection of a match between the intent and the information, access the convertible page.

* * * * *